United States Patent [19]

Grogan

[11] 4,432,025

[45] Feb. 14, 1984

[54] SYSTEM AND METHOD FOR FORMATTING PAIRS OF CONCENTRIC MAGNETIC TRACKS OF DIFFERENT CAPACITY TO A PLURALITY OF EQUAL CAPACITY LOGICAL TRACKS

[75] Inventor: John M. Grogan, San Jose, Calif.

[73] Assignee: International Business Machines Corporation, Armonk, N.Y.

[21] Appl. No.: 364,121

[22] Filed: Apr. 6, 1982

Related U.S. Application Data

[63] Continuation-in-part of Ser. No. 268,414, May 29, 1981, abandoned.

[51] Int. Cl.³ .............................................. G11B 5/09
[52] U.S. Cl. ......................................... 360/48; 360/39
[58] Field of Search ....................... 360/51, 50, 48, 40, 360/39

[56] References Cited

U.S. PATENT DOCUMENTS 3,829,837  8/1974  Farr, Jr. ................................ 360/48
4,231,071  10/1980  Anderson .............................. 360/51

OTHER PUBLICATIONS

"Disc File Memories" by H. J. McLaughlin, Instruments & Control Systems, Nov. 1961, vol. 64, pp. 2064–2068.

*Primary Examiner*—Vincent P. Canney
*Attorney, Agent, or Firm*—R. E. Cummins

[57] ABSTRACT

A method and system are disclosed for storing data on a magnetic disk file to increase the overall storage capacity of the file without complicating the data management functions and aspects of the connected data processing system. The system involves a magnetic disk having concentric recording tracks where a first inner group of tracks are recorded at one frequency f1, providing optimum track capacity X for these tracks, and a second outer group of tracks are recorded at a second frequency f2, which also provides optimum track capacity for these tracks. At each address position, a pair of magnetic transducers are associated with a different track from each group. During the writing or reading of serial by byte data, the pair of tracks are transduced on successive revolutions. Suitable switching circuitry for switching from one transducer to the other in response to sensing "index" is provided and also for changing the clock frequency. The system further includes suitable disk formatting circuitry for converting the two physical tracks into one (or more) logical tracks having the same byte capacity.

The method is characterized by the steps of switching at index from one transducer to the other and adjusting the clock frequency accordingly so all logical records have the same capacity. The magnetic disk may be divided into more than two groups of tracks, if desired.

12 Claims, 3 Drawing Figures

SYSTEM AND METHOD FOR FORMATTING PAIRS OF CONCENTRIC MAGNETIC TRACKS OF DIFFERENT CAPACITY TO A PLURALITY OF EQUAL CAPACITY LOGICAL TRACKS

CROSS-REFERENCE TO RELATED APPLICATIONS

The present application is a continuation-in-part of copending application Ser. No. 268,414 filed May 29, 1981 (now abandoned).

BACKGROUND OF INVENTION

This invention relates in general to systems and methods for storing data on magnetic disk files and, in particular, to an improved system and method for storing data on two or more different physical tracks at two or more different frequencies to optimize the byte capacity of each track.

DESCRIPTION OF PRIOR ART

Various arrangements are suggested in the art for storing data on a magnetic disk file. Generally, the disk file is arranged with each disk having a plurality of concentric recording tracks on which fixed or variable length records are recorded. In most systems, the amount of data stored on each track is the same regardless of its actual physical length, since one basic recording frequency is employed to record data on all tracks. Those persons having ordinary skill in the art of storing data on disk files understand and appreciate the advantage of having data tracks of equal known byte capacity where system considerations of data management are involved. Where each track of the system has the same capacity, the overall problems of where data is to be stored in the file is considerably simplified. It is, of course, known that where all the data is recorded at one frequency, a compromise is being made since the actual physical length of the tracks increase from the inside track to the outside track. It would, therefore, be possible to store considerably more data on a disk if the system was arranged so that the data was recorded at more than one frequency.

The prior art does suggest the recording of data at different frequencies on different tracks on the same disk so as to increase the overall storage capacity of the disk. However, such systems have not met with commercial acceptance because of the problems of additional overhead required of the rest of the system to manage the placement of data in the file. The present invention eliminates the data management problems encountered with prior art systems.

SUMMARY OF THE INVENTION

The system and method of the present invention records data in the file, for example, at two separate frequencies such that each track in an inner band of concentric tracks that are serviced by one read/write transducer stores "X bytes", while each track in an outer band of concentric tracks that are serviced by a second read/write transducer, which is moved in unison with the first transducer, stores "Y bytes" of data. The system processes records stored on equal length logical tracks which have a length equal to $(X+Y)/Z$, where Z is an integer of 1 or greater so that at least one logical record has a first part recorded at one frequency and a second part recorded at the other frequency. The system is arranged such that at each physical address of the transducer positioning system, the recording or reading operation involves switching from one transducer to the other at the index point on the disk, resyncing the recording channel to the new frequency, and continuing to record or read the logical track that was started prior to index.

It is, therefore, an object of the present invention to provide an improved system and method for storing data in a disk file at more than one frequency.

Another object of the present invention is to provide an improved method for reading and recording data at two or more separate frequencies in a disk file to increase overall storage capacity without causing data management problems.

A further object of the present invention is to provide a data storage system for a disk file in which at least two seperate physical tracks having different storage capacities are read or written consecutively on successive revolutions of the disk, and the resulting data is converted to one or more equal capacity logical tracks. At least one logical track, therefore, has a first portion recorded at one frequency and a second portion recorded at a second frequency.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
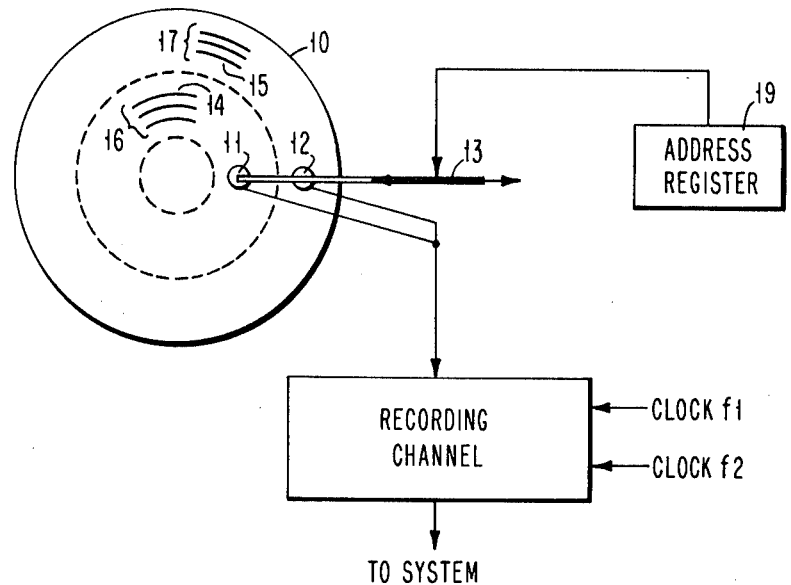
FIG. 1 illustrates in block diagram a disk file data storage system embodying the present invention.

The disk file, as shown diagrammatically in FIG. 1, comprises a magnetic recording disk 10, a pair of magnetic read/write transducers 11 and 12, means 13 for positioning the transducers 11 and 12 to selected concentric recording tracks 14, and means 15 for rotating the disk 10. One group of tracks 16 is associated with transducer 11 while the other group of tracks 17 is associated with transducer 12. Transducers 11 and 12 are positionable conjointly by positioning means 13 in response to a track address being supplied to the address register 19 of the positioning means 13. The group 16 of tracks which are serviced by transducer 11 are all recorded under the control of a clocking signal having a frequency f1; the group 17 of tracks which are serviced by transducer 12 are all recorded under a clocking signal having a frequency f2, which is higher than f1. As a result, all the tracks in group 16 have the same storage capacity C1 measured in terms of the number of byte positions. Likewise, all the tracks in group 17 have the same storage capacity C2, also measured in number of byte positions which will have a relationship to C1 which is similar to the relationship of f2 to f1. For purposes of explanation, it can be assumed that the tracks in group 16 each store 20,000 bytes, while the tracks in group 17 each store 28,000 bytes. Thus, f2 is equal to $1.4 \times f1$.

Figure 2:
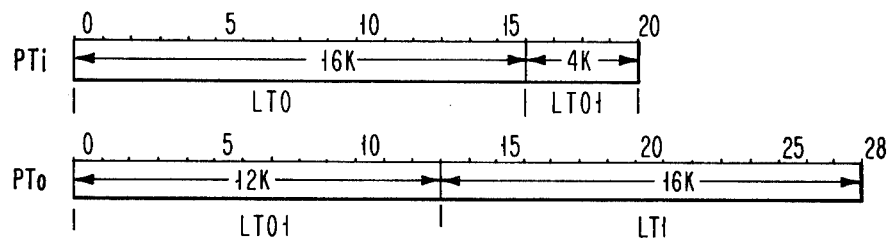
FIG. 2 is a drawing illustrating diagrammatically how two consecutive recording tracks read from the file on successive revolutions are converted to three logical tracks.

FIG. 2 illustrates how a pair of physical tracks PTi and PTo associated with one address position of the positioning means are formatted into, for example, three logical tracks LT0, LT01, and LT1. On the assumption that PTi has a 20,000 byte capacity and PTo has a 28,000 byte capacity, each logical track LT has a byte capacity of 16,000 bytes. The manner in which each logical track is actually formatted will depend on the system environment and the details thereof are not part of the present invention. Any format known in the art for formatting tracks into blocks, segments or count-key-and-data records may be employed. Therefore, no details of the record format of the logical track is included in this description of the invention. While FIG. 2 shows physical tracks PT1 and PT2 being divided into three logical tracks, it should be understood that the two tracks could be combined as one track of 48K bytes, two logical tracks of 24K bytes, four logical tracks of 12K bytes, etc.

Figure 3:
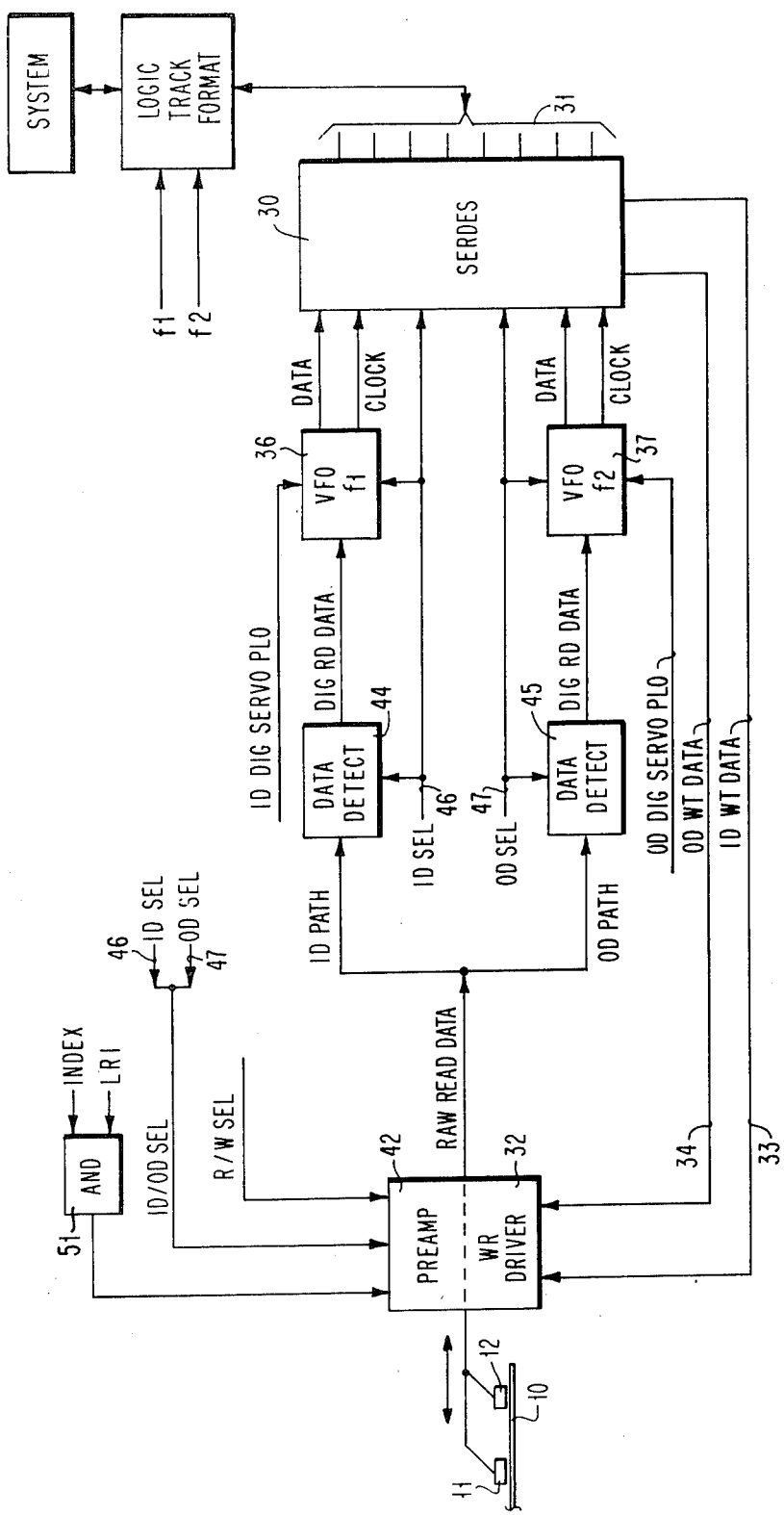
FIG. 3 illustrates the functional details of the recording channel shown in FIG. 1.

The details of the recording channel are shown functionally in FIG. 3. As shown in FIG. 3, the recording channel comprises the SERDES 30 whose function is to serialize the parallel by bit serial by byte data supplied from the data processing system (not shown) via bus 30. Serializer 30 also deserializes serial by bit data from the file to supply parallel by bit serial by byte data to the data processing system. Serial by bit write data is supplied to the write driver 32 on write data lines 33 and 34. Write data line 33 supplies write data frequency f1 which corresponds to the frequency of variable frequency oscillator 36 which is associated with the group of tracks serviced by transducer 11 corresponding to the inner band of recording tracks. The write data line 34 supplies write data at frequency f2 which corresponds to the frequency of variable frequency oscillator 37 which is associated with the group of tracks serviced by transducer 12 in the outer band of recording tracks. While two VFO oscillators are shown, one device which performs both functions may be employed.

Variable frequency oscillators 36 and 37 are synchronized by signals from a phase-locked oscillator whih is synchronized to the rotation of the disk file, as is well known in the art.

The write driver 32 is selected by a read/write logic signal which indicates a write or read operation for one of the heads. One of the two transducers are selected by the ID/OD select signal. This latter signal is switched at index by the output of AND-gate 51 from transducer 11 to transducer 12 whenever the logical track spanning index is addressed by the system.

The transducer 11 and 12 are also connected to the preamplifier 42 which provides raw read data to a pair of data detectors 44 and 45, one of which is associated with each head.

Data detector 44 is selected by the "ID" select line 46 while data detector 45 is selected by the "OD" select line 47. The output of the data detector 44 is supplied to the VFO 36 which provides standardized data and a double frequency clock signal to the SERDES block on the assumption that data was initially encoded and recorded on the file in one of the known double frequency self-clocking codes.

Data detector 45 likewise is connected to VFO 37 to provide similar signals to SERDES 30.

The operation of the system shown is as follows. Assume, for example, that three logical tracks, each having a 16K byte capacity, are to be written as shown in FIG. 2. It should further be assumed that the serial by byte data supplied to SERDES 30 comprises both format type data and actual data bytes from the system, and that each logical track is formatted as a conventional count-key-and-data record permitting variable length data records in each of the tracks. Under the above assumption, SERDES is loaded under the control of the system with appropriate format data which determines the count-key-and-data fields along with the respective G1, G2 and G3 gaps, such that three separate logical tracks are stored on two physical tracks corresponding to one address of the transducer positioning system.

During the writing of the second logical track, after the transfer of the first 4K bytes of data to SERDES, the end of the inner physical track 14 being serviced by transducer 11 is sensed, i.e., index, and the ID/OD select line switched to actuate transducer 12 which continues to record the remaining 12K bytes of data on the outer physical track 15 at the frequency f2, since the write data is now being supplied at frequency f2 which is higher than f1. Logical track 3 is stored on the second physical track after 12K bytes of data are recorded for logical track 2. The overall result is as shown in FIG. 2. That is, three logical tracks L0, L01 and L1, each having the same capacity, have been stored on two separate physical tracks and are recorded at two separate frequencies to optimize their respective storage capacities.

A similar operation occurs when data is read, the appropriate switching action occurring at the end of the first physical track so that if the second logical track LT01 is being accessed, 4K bytes of data are read from the inner track 14 at frequency f1, while 12K bytes of data are read from the outer track 15 at frequency f2.

The accessing of records of less than a track in length is accomplished in a manner similar to conventional prior art systems in which the logical track corresponds exactly to the physical track, or at least in systems where a logical track does not split two physical tracks recorded at different frequencies.

While the invention has been particularly shown and described with reference to a preferred embodiment thereof, it will be understood by those skilled in the art that various other changes in the form and details may be made therein without departing from the spirit and scope of the invention. For example, the disk could be divided into three groups of tracks and the positioning system provided with three separate but conjointly positioned transducers to record data at frequencies f1, f2 and f3, respectively, such that three physical tracks would be addressed at one position to provide n logical tracks of equal length where n is an integer of 1 or greater.

It will also be recognized by those persons skilled in the art that the concept disclosed may be extended to include more than one disk surface since it is conventional in today's disk file configuration employing more than one recording surface to provide transducers which are permanently associated with each recording surface of the disk file. Depending on the relationship of the capacity of the physical tracks that are concatenated on one surface to the desired capacity of the logical tracks, the system could be arranged, for example, to first switch from the inside track to the outside track as previously described, then, at the end of the second revolution, switch to the outside track on another disk surface, and, at the end of the third revolution, switch to the inside track of the other surface so that at the end of the operation four physical tracks have been concatenated. Under such an arrangement, five logical tracks of 60K bytes could be stored on four physical tracks where the inner tracks have a capacity of 65K and the outer tracks a capacity of 85K bytes.

Having thus described my invention, what I claim as new and desire to secure by Letters Patent is:

1. A disk file including at least one disk having first and second groups of concentric recording tracks, first and second magnetic transducers each of which are associated with a different one of said groups and positionable conjointly to a selected pair of tracks in different said groups in response to an externally supplied address signal, means for generating first and second recording frequencies which control the linear recording densities of respective said tracks in said first and second groups whereby the byte capacity per track of said first group of tracks is X bytes and of said second group of tracks is Y bytes, said file being characterized by each said pair of physical tracks having at least one logical track which includes a first portion on one physical track and a second portion on the other physical track which portions are transduced in one continuous operation.

2. The disk file recited in claim 1 further including means for switching from one of said recording frequencies to the other in response to sensing an index signal transduced from said file at the end of transducing said first portion.

3. The file recited in claim 2 further including means for phase synchronizing the selected recording frequency to the rotation of said file.

4. The file recited in claim 1 further including means for generating an index signal which defines the beginning of each physical track and means for selectively switching from said first transducer to said second transducer in response to sensing said index signal from said file.

5. The disk file recited in claim 4 in which said means for generating first and second recording frequencies includes a variable frequency oscillator and means for switching and oscillator from said one frequency to the other in response to sensing the index signal.

6. The disk file recited in claim 5 in which each said pair of physical tracks is formatted into a plurality of equal capacity logical tracks.

7. A disk file including at least one disk having n groups of concentric recording tracks, n magnetic transducers, each of which is associated with a different one of said groups and each is positionable conjointly to a selected track in different said groups in response to an externally supplied address signal, means for generating n different recording frequencies which control the linear recording densities of respective said tracks in said n groups, said file being characterized by portions of physical tracks from at least two adjacent groups being transduced in one continuous operation to provide at least one logical track having a capacity which is a submultiple of the sum of the byte capacities of said n physical tracks.

8. The disk file recited in claim 7 in which said one continuous operation involves transducing said track portions at different frequencies.

9. A method of transducing pairs of concentric physical recording tracks on a magnetic disk which tracks are recorded at different frequencies that result in each track of said pair having a different byte capacity, into one or more equal capacity logical tracks, said method comprising:

(a) transducing a portion of one physical track of said pair with a first transducer at a first frequency;

(b) switching said first transducer off at the end of said one physical track;

(c) transducing a portion of said other physical track of said pair with a second transducer at a second frequency; and (d) generating a signal indicating the end of a logical track comprising said portion each time a predetermined number of byte positions have been transduced by said transducers corresponping to said equal capacity to provide one or more logical tracks.

10. The method recited in claim 9 further including the step of conjointly positioning said first and second transducers to a selected pair of physical tracks in response to a single address signal.

11. The method recited in claim 10 further including the step of generating an index signal at the end of said first physical track and supplying said index signal to control circuitry to initiate said switching step.

12. The method recited in claim 11 in which a first logical record is transduced at a first data rate, a second logical record has a first portion transduced at said first data rate, and another portion transduced at a second data rate, and a third logical record is transduced at said second data rate.

* * * * *